June 18, 1963 J. G. MADGE 3,093,852
VERTICAL WASHER FOR FLAT GLASS
Filed Dec. 18, 1961 5 Sheets-Sheet 1

JOSEPH G. MADGE
INVENTOR.

BY J. R. Faulkner
P. F. Hilder
ATTORNEYS

JOSEPH G. MADGE
INVENTOR.

BY J. R. Faulkner
P. F. Hilder
ATTORNEYS

June 18, 1963 J. G. MADGE 3,093,852
VERTICAL WASHER FOR FLAT GLASS
Filed Dec. 18, 1961 5 Sheets-Sheet 3

JOSEPH G. MADGE
INVENTOR.

BY J. R. Faulkner
P. F. Hilder
ATTORNEYS

INVENTOR.
JOSEPH G. MADGE
BY
J. R. Faulkner
P. F. Hilder
ATTORNEYS 3,093,852
VERTICAL WASHER FOR FLAT GLASS
Joseph G. Madge, Dearborn, Mich., assignor to Ford Motor Company, Dearborn, Mich., a corporation of Delaware
Filed Dec. 18, 1961, Ser. No. 159,929
6 Claims. (Cl. 15—77)

This invention relates to machines for the washing of flat pieces of glass.

In the fabrication of automotive safety glass, it is necessary to wash the glass before further processing in order to remove glass chips, dirt and oil that otherwise would scratch or become embedded in the glass during further processing. The machine of the present invention is adapted to wash flat pieces of glass which usually already have been cut to bracket size or final size.

In the washer of the present invention, the glass is carried through the washer while positioned in a vertical plane. The glass is carried to the washer on a conveyer and is supported and moved forwardly through the washer by means of pairs of opposed, vertically extending rolls, the rolls on one side of the glass being driven and the rolls on the other side being idler rolls. Between pairs of rolls, driven, vertically extending rotary washing brushes located one on each side of the glass wash the glass as it moves forwardly through the washer. Water, to which a detergent has been added, is sprayed over the glass and brushes.

The sides of the washer are generally enclosed to confine the wash water. However, from time to time it may be necessary to open the washer to remove glass which has become broken in the washer. According to the present invention, both the idler feed rolls and the brushes on one side of the glass are mounted on a door on one side of the washer to permit access to the brushes and rolls on both sides of the glass and facilitate complete removal of chips and small fragments of glass from both the brushes and the rolls. This prevents scratching and breaking of glass subsequently passing through the washer and prevents cutting of the rolls by glass fragments.

Among the objects of the present invention are to provide an improved vertical glass washer having a roll and brush mounting and drive which facilities clean-out of broken glass, to provide such a washer in which the rolls and brushes for contacting one side of the glass are mounted on an access door, to provide an improved drive for the brushes, to provide an improved pair of feed rolls at the entrance to the washer, and generally to improve washers of the type described.

Other objects, and objects relating to details and economies of construction will be apparent from the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Figure 1:
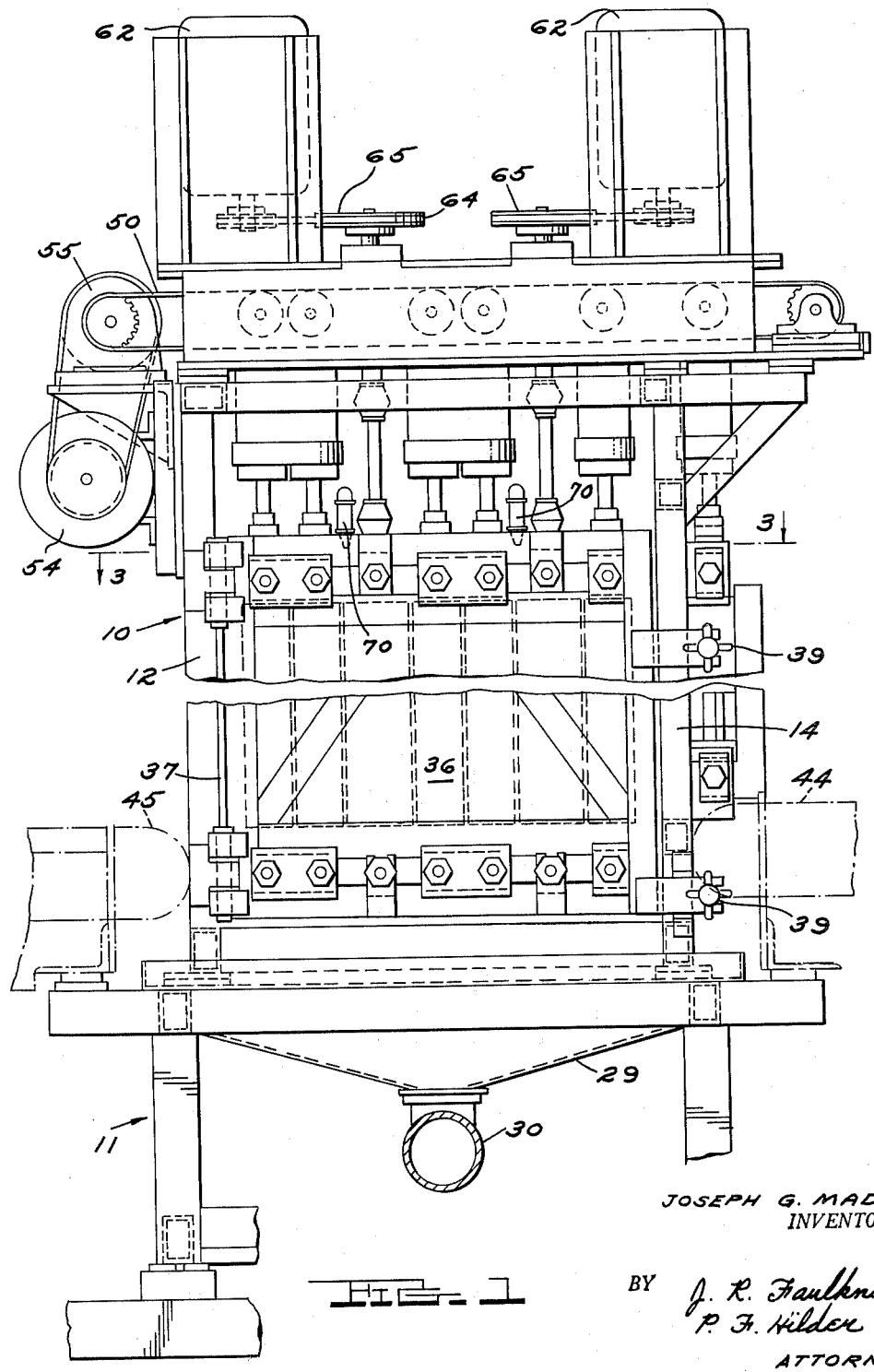
FIGURE 1 is a side elevation of the vertical washer, portions of the conveyers for bringing the glass to and from the washer being indicated in broken line and a part of the base and intermediate portion of the washer being broken away for convenience of illustration.
Figure 2:
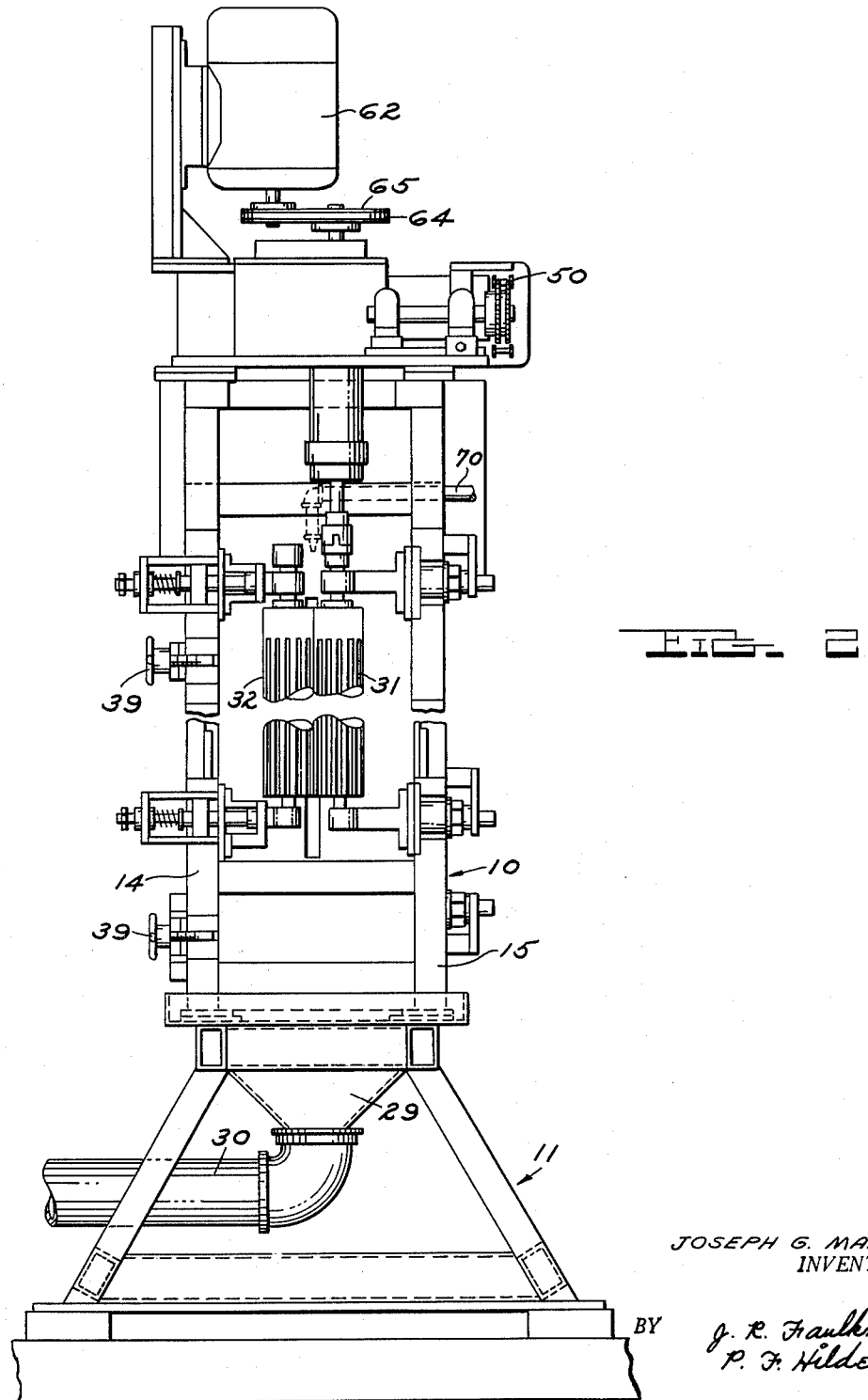
FIGURE 2 is an end elevation of the glass-entering side of the washer, the intermediate portion of the washer being broken away and the end wall at the entering side of the washer being omitted.
Figure 3:
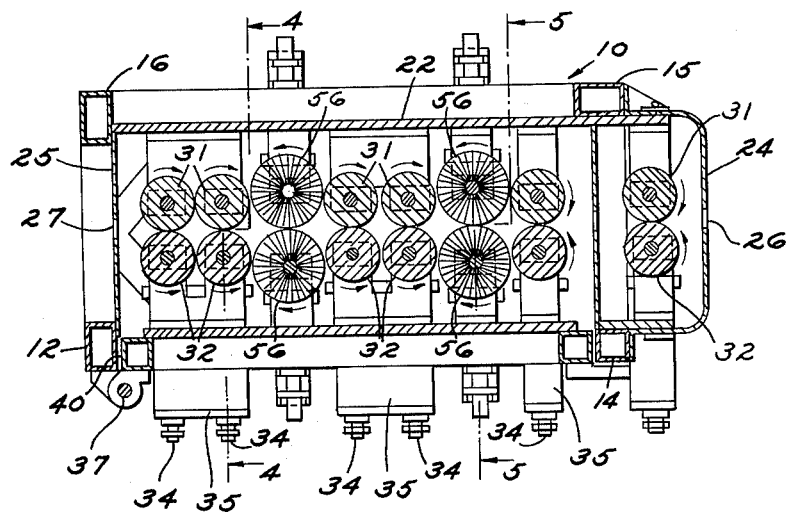
FIGURE 3 is a horizontal cross section through the washer, taken generally along the line 3—3 of FIGURE 1.

Referring now to the drawings, the machine of the present invention includes a rigid frame 10 formed of steel tubing of rectangular cross section. The frame includes a base portion 11 for supporting the machine at a convenient height from the floor. The frame also comprises vertical corner posts 12, 14, 15 and 16 which are connected by horizontal members 17 at the top of the machine and 19 and 20 at the bottom of the machine. Intermediate horizontal members 21 connect the rear corner posts 15 and 16. A sheet metal plate 22 extending between the horizontal members 17 and 20 encloses the back of the machine, and end walls 24 and 25 enclose the ends of the machine, the walls 24 and 25 having centrally located vertical slots 26 and 27 for entrance and exit of glass. A sump or drain pan 29 encloses the bottom of the washer and is connected to a drain 30 for draining away wash water.

Figure 4:
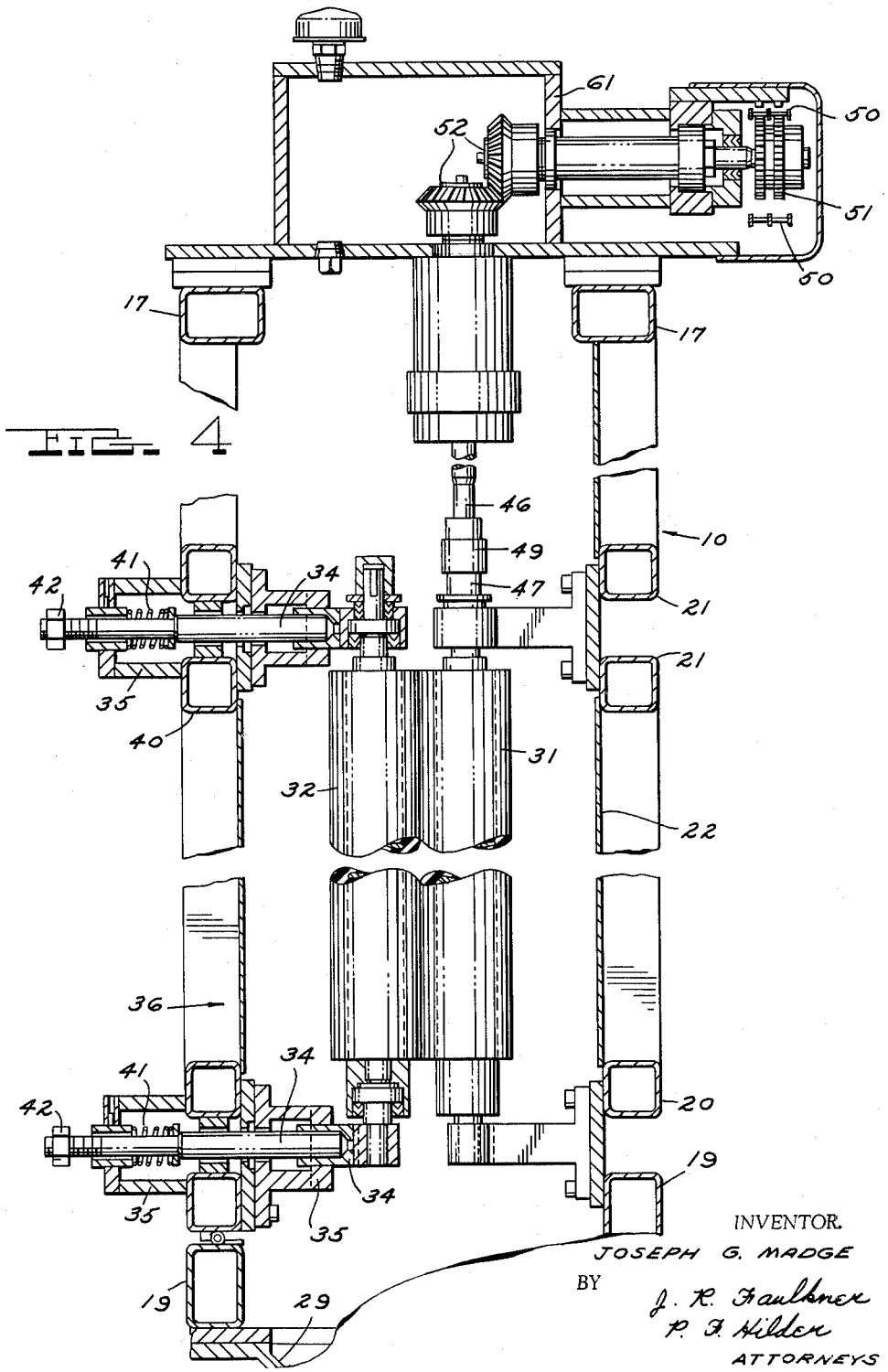
FIGURE 4 is an enlarged vertical cross section of the washer, taken generally along the line 4—4 of FIGURE 3, intermediate portions and the lower portion of the washer being broken away for convenience of illustration.
Figure 5:
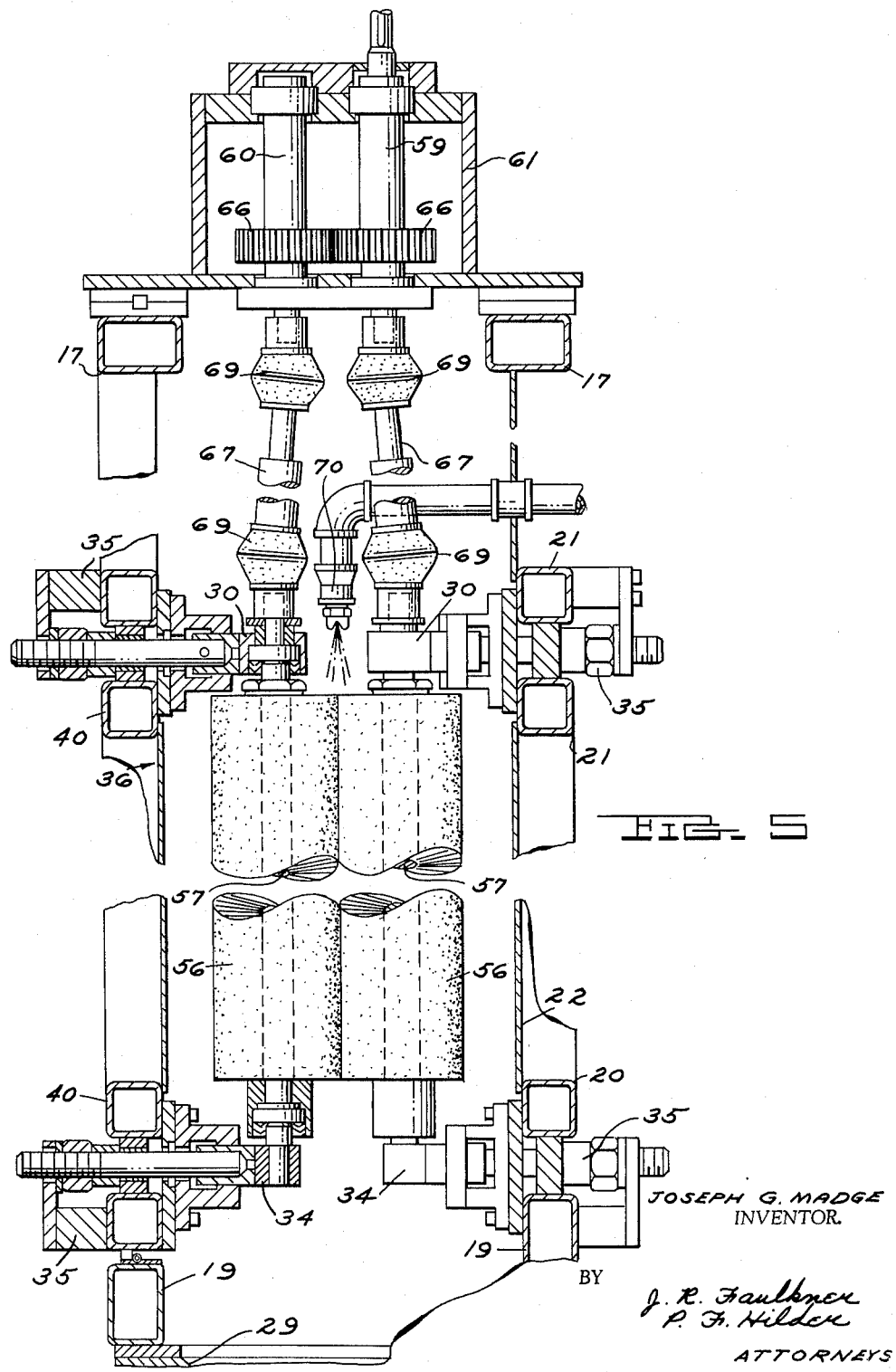
FIGURE 5 is an enlarged vertical cross section of the washer, taken generally along the line 5—5 of FIGURE 3, intermediate portions and the lower portion of the washer being broken away for convenience of illustration.

The washer includes a plurality of pairs of opposed feed rolls 31 and 32 which extend vertically and are mounted for rotation on vertical axes. Referring to FIGURE 4, it will be noted that the feed rolls 31 are supported from the horizontal members 19 and 29 adjacent their lower end and the members 21 adjacent their upper end. The axes of these feed rolls are fixed.

The feed rolls 32 are supported on a door 36 extending across substantially the entire front of the washer and hinged to the frame corner member 12 by means of a hinge pin 37. A pair of hand screws 39 at the opposite side of the door and engaged with the front corner post 14 serve to clamp the door in closed position during operation of the washer.

The feed rolls 32 are supported for lateral movement towards and away from the rolls 31 by means of screw-threaded supports 34 which are slidably received within a guide structure 35. A spring 41 biases each roll 32 towards the roll 31, and a hold-back nut 42 on each support 34 limits inward movement of the roll. The rolls 32 of all but the first set of feed rolls are mounted on the frame 40 of the door (see FIGURE 4).

The first set of feed rolls 31 and 32 are located at the entering side of the washer. These feed rolls are mounted on the corner posts 14 and 15. One of the feed rolls is mounted on a fixed axis similar to the mounting of feed rolls 31, and the other roll is spring-pressed. Either one or both of the first set of feed rolls at the entering side of the washer may be fluted. In the drawings, both of the first set of feed rolls are indicated as being fluted.

The rolls 32 are biased against the rolls 31 by the springs 41, the "nip" or line of contact between the pairs of rolls lying in a vertical plane extending longitudinally through the washer. A conveyor 44, which may be of the belt type, carries the individual pieces of glass oriented generally in a vertical plane to the washer, and a second conveyor 45 receives glass from the washer and takes it onward for further processing. During its passage through the washer, the sheets of glass are supported solely by being engaged between the rolls 31 and 32. Preferably, the conveyor 45 is located at a slightly lower elevation than the conveyor 44 to provide a little clearance in receiving the lower edge of the glass as it exits from the washer.

The feed rolls 31 are driven by means of a vertical shaft 46 coupled to an axial shaft 47 of each feed roll by a coupling 49 capable of limited universal movement to provide for minor shaft misalignment (FIGURE 4). Shaft 46 is driven by means of a chain 50, sprockets 51 and bevel gears 52 located in a gear box 61. Chain 50 is driven by an electric motor 54 mounted on the frame 10, driving through a reduction drive 55. All of the feed rolls 31 are driven at the same speed and by a single chain 50.

The feed rolls 32 need not be power driven, but are rotated by engagement with the rolls 31 or with the glass passing through the washer.

Washing of the glass is accomplished by two pairs of oposed, vertically extending rotary brushes 56 which are located intermediate the feed rolls. The brushes 56 are formed of natural or synthetic bristles mounted on a central shaft.

The rotary brushes 56 are mounted in opposed pairs, one brush of each pair being mounted on the horizontal frame members 19, 20 and 21 and the other brush of the pair being mounted on the door frame 40. The mounting includes supports 34 similar to the supports for the feed rolls 32 which rotatably receive the axial shaft 57 of the brushes. In this instance, however, the supports 34 are adjustably mounted within the frame 10 and door frame 40, but are not spring-pressed. The adjustable mounting of the brushes permits adjusting the brushes inwardly towards the glass as wear of the brushes occurs.

Each pair of brushes 56 is rotated by a drive including a pair of vertical shafts 59 and 60 journaled in the gear box 61 mounted on the top of the frame 10. The shaft 59 of each pair of brushes is driven from an electric motor 62 through a V belt 64 and pulley 65. A pair of spur gears 66 mounted on shafts 59 and 60 drive the shaft 60 from the shaft 59.

The shafts 59 and 60 are connected with the central shafts 57 of the brushes by means of short telescoping shafts 67 and pairs of universal joints 69. The driving connection with the door-mounted brushes 56 permits sufficient movement of the universal joints to separate the telescoping shaft 67, and thus permits the door 40 to be opened to its fullest extent.

Preferably, there are two pairs of brushes mounted within the washer, as indicated in the drawings, and a wash water spray head 70 is positioned to spray water onto each pair of brushes.

In operation of the machine, the pieces of glass, which lie in a general vertical plane, are carried to the washer where they are engaged by the two pairs of opposed feed rolls 31 and 32. The fluted surface of one or both of the rolls provides for immediately gripping the glass and propelling it forwardly into the washer and into engagement with the next pair of rolls 31 and 32. Each piece of glass is supported and carried through the washer between the feed rolls and, in its passage, is washed by action of the two pairs of rotary brushes. At the exit end of the washer, the glass is deposited on the conveyor 45.

Should any glass become broken within the washer, the washer and conveyors may be stopped and the door 40 released and opened on its pin 37, the shaft 67 providing for disconnection of the drive to the door-mounted brushes. Opening of the door separates the pairs of feed rolls and brushes so that any pieces of glass may readily be cleaned from both the brushes and the rolls. After cleaning out the broken glass, the telescoping shafts 67 for driving the door-mounted brushes may be re-engaged as the door is closed.

I claim:

1. A vertical washer for glass, said washer having an enclosed, horizontally elongated housing, pairs of vertically extending opposed feed rolls within the housing, the nip of each pair of rolls lying along a common vertical plane extending longitudinally of the housing, a vertically extending rotary brush positioned on each side of said vertical plane between certain of the pairs of feed rolls, a door mounted on the housing opposite the feed rolls and rotary brushes for outward opening movement, the feed rolls and brushes on the side of the plane adjacent the door being mounted on the door, and means for driving the feed rolls on the side of the plane remote from the door and for driving the brushes.

2. A vertical washer for glass, said washer having an enclosed, horizontally elongated housing, pairs of vertically extending opposed feed rolls within the housing, the nip of each pair of rolls lying along a common vertical plane extending longitudinally of the housing, a pair of opposed, vertically extending rotary brushes positioned one on each side of said vertical plane between certain of the pairs of feed rolls, a door mounted on the housing opposite the feed rolls and rotary brushes for outward swinging movement on a vertical axis, the feed rolls and brush on the side of the plane adjacent the door being mounted on the door, and means for driving the feed rolls on the side of the plane remote from the door and for driving all of the brushes.

3. A vertical washer for glass, said washer having an enclosed, horizontally elongated housing, pairs of vertically extending opposed feed rolls within the housing, the nip of each pair of rolls lying along a common vertical plane extending longitudinally of the housing, a pair of opposed, vertically extending rotary brushes positioned one on each side of said vertical plane between certain of the pairs of feed rolls, a door mounted on the housing opposite the feed rolls and rotary brushes for outward opening movement, the feed rolls and brush on the side of the plane adjacent the door being mounted on the door, and means for driving the feed rolls on the side of the plane remote from the door and for driving all of the brushes.

4. A vertical washer for glass as claimed in claim 3, in which the feed rolls on the same side of the plane as the door are idler rolls.

5. A vertical washer for glass, said washer having an enclosed, horizontally elongated housing, pairs of vertically extending opposed feed rolls within the housing, the nip of each pair of rolls lying along a common vertical plane extending longitudinally of the housing, a vertically extending rotary brush positioned on each side of said vertical plane between certain of the pairs of feed rolls, a door mounted on one side of the housing opposite the feed rolls and rotary brushes for outward opening movement, the feed rolls and brushes on the side of the plane adjacent the door being mounted on the door, and means for driving the feed rolls on the side of the plane remote from the door and for driving the brushes, the driving means to the door-mounted brush comprising telescoping elements readily disconnectable to permit opening the door.

6. A vertical washer for glass, said washer having an enclosed, horizontally elongated housing, pairs of vertically extending opposed feed rolls within the housing, the nip of each pair of rolls lying along a common vertical plane extending longitudinally of the housing, a vertically extending rotary brush positioned on each side of said vertical plane between certain of the pairs of feed rolls, a door mounted on one side of the housing opposite the feed rolls and rotary brushes for outward swinging movement on a vertical pivot, the feed rolls and brushes on the side of the plane adjacent the door being mounted on the door, and means for driving the feed rolls on the side of the plane remote from the door and for driving the brushes, the driving means to the door-mounted brush comprising telescoping elements readily disconnectable to permit opening the door.

References Cited in the file of this patent
UNITED STATES PATENTS

| | | |
|---|---|---|
| 1,817,332 | Worrall | Aug. 4, 1931 |
| 2,313,606 | Webb et al. | Mar. 9, 1943 |
| 2,343,532 | Buckley | Mar. 7, 1944 |